United States Patent
Scheuren

(10) Patent No.: US 8,261,037 B2
(45) Date of Patent: Sep. 4, 2012

(54) STORAGE SELF-HEALING AND CAPACITY PLANNING SYSTEM AND METHOD

(75) Inventor: Sylvia Scheuren, Huntington, NY (US)

(73) Assignee: CA, Inc., Islandia, NY (US)

( * ) Notice: Subject to any disclaimer, the term of this patent is extended or adjusted under 35 U.S.C. 154(b) by 240 days.

(21) Appl. No.: 10/889,716

(22) Filed: Jul. 12, 2004

(65) Prior Publication Data

US 2005/0193231 A1    Sep. 1, 2005

Related U.S. Application Data

(60) Provisional application No. 60/486,790, filed on Jul. 11, 2003.

(51) Int. Cl.
*G06F 12/00* (2006.01)

(52) U.S. Cl. ........ 711/170; 711/147; 711/154; 709/223; 709/224; 709/225; 709/226

(58) Field of Classification Search .................. 711/147, 711/154, 170; 709/223–226
See application file for complete search history.

(56) References Cited

U.S. PATENT DOCUMENTS

| | | | | |
|---|---|---|---|---|
| 5,287,500 | A * | 2/1994 | Stoppani, Jr. ................. | 711/211 |
| 6,519,679 | B2 * | 2/2003 | Devireddy et al. ........... | 711/114 |
| 6,732,166 | B1 * | 5/2004 | Woodruff ...................... | 709/221 |
| 6,801,992 | B2 * | 10/2004 | Gajjar et al. .................. | 711/173 |
| 6,832,248 | B1 * | 12/2004 | Byrnes ........................... | 709/223 |
| 6,968,463 | B2 * | 11/2005 | Pherson et al. ................... | 726/3 |
| 6,977,927 | B1 * | 12/2005 | Bates et al. .................... | 370/381 |
| 7,003,562 | B2 * | 2/2006 | Mayer ........................... | 709/223 |
| 7,133,907 | B2 * | 11/2006 | Carlson et al. ................ | 709/220 |
| 7,167,915 | B2 * | 1/2007 | Bendich et al. ............... | 709/224 |
| 7,194,533 | B1 * | 3/2007 | DeLuca ......................... | 709/224 |
| 7,328,259 | B2 * | 2/2008 | Srinivasan et al. ............ | 709/223 |
| 7,577,729 | B1 * | 8/2009 | Umbehocker et al. ........ | 709/223 |
| 2002/0004913 | A1 * | 1/2002 | Fung ............................. | 713/300 |
| 2002/0095602 | A1 * | 7/2002 | Pherson et al. ............... | 713/201 |
| 2002/0133491 | A1 * | 9/2002 | Sim et al. ........................ | 707/10 |
| 2002/0133669 | A1 * | 9/2002 | Devireddy et al. ........... | 711/114 |
| 2002/0147828 | A1 * | 10/2002 | Chen et al. .................... | 709/231 |
| 2002/0174306 | A1 * | 11/2002 | Gajjar et al. .................. | 711/148 |
| 2002/0178246 | A1 * | 11/2002 | Mayer ........................... | 709/223 |
| 2003/0021283 | A1 * | 1/2003 | See et al. ....................... | 370/401 |
| 2003/0061331 | A1 | 3/2003 | Nakamura et al. | |

(Continued)

FOREIGN PATENT DOCUMENTS

| EP | 1 271 296 | 1/2003 |
|---|---|---|
| WO | WO 02/065309 | 8/2002 |
| WO | WO 03/014911 | 2/2003 |

OTHER PUBLICATIONS

Kephart et al., "The Vision of Autonomic Computing," IEEE, XP 11095404A, pp. 41-50, Jan. 2003.

(Continued)

*Primary Examiner* — Arpan P. Savla
(74) *Attorney, Agent, or Firm* — Baker Botts L.L.P.

(57) ABSTRACT

The storage self-healing/capacity planning system and method enables SAN resources to be reserved by allowing one or more policies to be set up for the resources. A conformance check is made, for example, upon receiving an event associated with the one or more resources, to ensure that the event occurring is in conformance with the one or more reserved policies. When violation is detected, one or more enforcement rules may be invoked automatically.

15 Claims, 4 Drawing Sheets

U.S. PATENT DOCUMENTS

2004/0025162 A1    2/2004   Fisk
2004/0111725 A1*   6/2004   Srinivasan et al. ............ 718/105
2004/0243699 A1*  12/2004   Koclanes et al. ............. 709/224

OTHER PUBLICATIONS

EPO Communication, Application No. 04778240.4-1245/1652042 PCT/US2004022635, Jan. 29, 2009.

EPO Communication, Application No. 04 778 240.4-1245, Ref. No. HDC/J00048581EP, 6 pages, Jan. 14, 2011.

EPO Communication Pursuant to Article 94(3) EPC, Application No. 04 778 240.4-1245, Ref. HCD/J00048581EP, transmitted to Baker Botts L.L.P. on Apr. 18, 2012, 7 pages.

* cited by examiner

FIG. 2

| RESOURCE CLASS | RESERVATION POLICIES | ENFORCEMENT ACTIONS | ZONING POLICIES | QOS POLICIES |
|---|---|---|---|---|
| SWITCH PORT | BY OPERATING SYSTEM | DISABLE SWITCH PORT | HARD ZONE ONLY | |
| | BY STORAGE | | SOFT ZONE ONLY | |
| | BY INITIATOR TYPE | | USE ZONING | |
| | BY PORT/NODE WWN | | | |
| | BY STORAGE VENDOR | | | |
| | BY STORAGE MODEL | | | |
| | BY HOST/RANGE OF HOSTS | | | |
| | ISL | | | |
| | BY SWITCH | | | |
| RAID PORT | BY OPERATING SYSTEM | ZONE OUT PORT | NO LUN MASKING | NUMBER OF PATHS (FANOUT RATIO) |
| | BY HOST/RANGE OF HOSTS | DISABLE CONNECTED SWITCH PORTS | NO ZONING | |
| | BY SWITCH | | | |
| LUN/RG/ SPINDLE | BY APPLICATION | MASK LUN | | |
| | BY OPERATING SYSTEM | | | |
| | BY HOST/RANGE OF HOSTS | | | |
| | BY PORT/NODE WWN | | | |
| | BY CLUSTER | | | |
| | BY LOGICAL VOLUME | | | |
| | BY CLUSTER RESOURCE | | | |
| APPLICATION | | | | RAID TYPE (REMOTE MIRRORING) |
| | | | | NUMBER OF SAN PATHS |
| | | | | STORAGE VENDOR/MODEL |
| | | | | CLUSTER VOLUME |
| | | | | CAPACITY |
| | | | | EXPANSION TYPE |
| | | | | NUMBER OF HBAs |
| LOGICAL/ PHYSICAL VOLUME | | | NO ZONING | CLUSTER VOLUME |
| | | | NO LUN MASKING | NUMBER OF PATHS |
| | | | | EXPANSION TYPE |

STORAGE SELF-HEALING AND CAPACITY PLANNING SYSTEM AND METHOD

CROSS-REFERENCE TO RELATED APPLICATIONS

This application claims the benefit of U.S. Provisional Patent Application No. 60/486,790 entitled SAN/STORAGE SELF-HEALING/CAPACITY PLANNING POLICIES filed on Jul. 11, 2003, the entire disclosure of which is incorporated herein by reference.

TECHNICAL FIELD

This application relates to storage area network management.

BACKGROUND

The main fear with storage administrators is the loss of data in business applications resulting in system-wide outages. To restore the data would be costly. Although storage management needs to be made easy for storage administrators, for instance, user friendly to those that may be less experienced in storage administration and to cover the lack of knowledge, if provisioning actions are very user friendly, mistakes can be made more readily as well. For example, drag and drop provisioning is a very popular feature in SAN administration, reducing the complexity of managing a SAN. However, it is also easy to make a mistake using a drag and drop feature.

Accordingly, a storage management system and method that is user friendly and easy to use, but also allow for tighter control so that mistakes are not made easily or to quickly detect and counteract the mistakes, are desirable.

Another area of desirable improvement is the ability to integrate SAN design tools with the SAN management tools. For example, SAN designer technology is available that allows storage administrators or users to setup policies that they desire. It would be desirable to have an import tool that imports the policies for instance, designed through SAN designer technology, into the SAN manager such that SAN manager would capture the intent of the storage administrator, and automatically provision the policies.

Yet another area of desirable improvement stems from the assumption that storage administrators need similar control over their environment the same way as the system administrators in the IT (information technology) world. For example, the storage administrators need to assure that their systems are readily available for business. They cannot afford errors or if there are problems, need to be able to determine very quickly what happened. The current provisioning tools are lacking a mechanism for change control. Therefore, it is desirable to have a system and method that would allow a storage administrator to quickly determine and/or have control over what occurs in the SAN.

For instance, customer's systems may accidentally gain access to restricted volumes and cause outages. Without proper control, it may be difficult for the customer to track what had changed and what action eventually caused the problem. Although guesses can be made as to the source of the problem, for instance, a bad LUN masking operation, there may be no record or proof of it. Thus, there is a need for change control, even in small SAN environments. Even if the only enforcement action is to record a change and report a policy violation, this customer would be equipped with the information of what went wrong, and may be able to prevent the same problem in the future.

The currently existing automatic provisioning supported by various vendors are heavily concentrated on QOS (Quality of Service). Usually, these policies allow the user to determine what level of QOS they want to have and if they want to use zoning versus LUN masking. They are limited in the automated actions they can provide and policies are typically hard-coded and there is a very limited set of policies available. A limited set of events like exceeding thresholds is supported in the existing provisioning tools. Accordingly, wider-coverage of automatic, for instance, event-driven, policy provisioning system and method is desirable.

SUMMARY

A storage self-healing and capacity planning system and method are provided. The system in one aspect comprises one or more policy wizard modules operable to setup one or more policies associated with one or more computer storage device resources. A conformance policy checker is operable to check for conformance of the one or more policies in response to receiving one or more events associated with the one or more computer storage device resources. The conformance policy checker is further operable to invoke one or more enforcement rules associated with one or more policies, if any, if a violation of the one or more policies is detected.

The method in one aspect comprises allowing one or more policies to be reserved for one or more computer storage device resources, receiving an event associated with the one or more computer storage device resources, checking that a computer storage device resource associated with the event received conforms to the reserved one or more policies, and if the computer storage device resource associated with the event received does not conform to the reserved one or more policies, invoking an enforcement rule associated with the reserved one or more policies.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 2 illustrates an example listing of resource classes, their supported policies and their hierarchies.

DETAILED DESCRIPTION

The system and method of the present disclosure in one embodiment allows storage administrators to discover, monitor, and administer their networked storage based environment. The system and method of the present disclosure in one embodiment provide SAN (storage area network) capacity planning and self-healing policies that enable a SAN administrator to reserve SAN resources for future usage, ensure that resources are properly allocated, and for change control, that is, capture events that occur in the SAN to monitor and control changes occurring. SAN capacity planning and self-healing policies may be implemented as an integrated function of an existing SAN managers, or alternatively, as a stand along program that, for instance, can communicate with an existing SAN managing components.

The policies of the present disclosure enable the storage or SAN administrator to pre-allocate resources and enforce their proper distribution. Thus, for example, SAN provisioning policies allow the user to specify by application or host how new disk space should be allocated once it is requested. For example, an administrator may want an application to have RAID0+1 types of LUNs, which means that the volume shall be locally mirrored and remotely replicated. RAID refers to redundant array of independent disks. LUN refers to logical unit number, for example, used, for example, to identify SCSI devices so that host can address and access the data on each disk drive in an array.

Through the policies, administrators can control that the right storage resources are assigned to the right consumers. The policies are a set of error checks and reservation guidelines implemented as properties in the Common Services CORE (Worldview repository) for every SAN resource. In one embodiment, the resources supported may include switch ports, storage ports, RAID (redundancy array of independent disks) volumes, and RAID spindles. Examples for reservation policies may include reserve by application, list of hosts, operating system, storage type (tape or disk), RAID model, and World Wide Name.

In one embodiment, the reservation policies are hierarchically structured to allow very generic down to very specific reservation of resources. The policies have a set of predefined enforcement actions. An example of an enforcement action may be the prevention of the resource allocation. Combined with change monitoring/events and integrated into administrative actions, these policies allow the SAN/Storage to be laid out the way the storage administrator intended them to be.

In one embodiment, the policies are designed to warn of policy violations coupled with SAN resource specific enforcement actions, for example, to prevent costly errors. SAN/storage administrators may be enabled to plan ahead as well as get control over a complex environment, for instance, by defining policies for the SAN layout/plan as desired.

Figure 1:
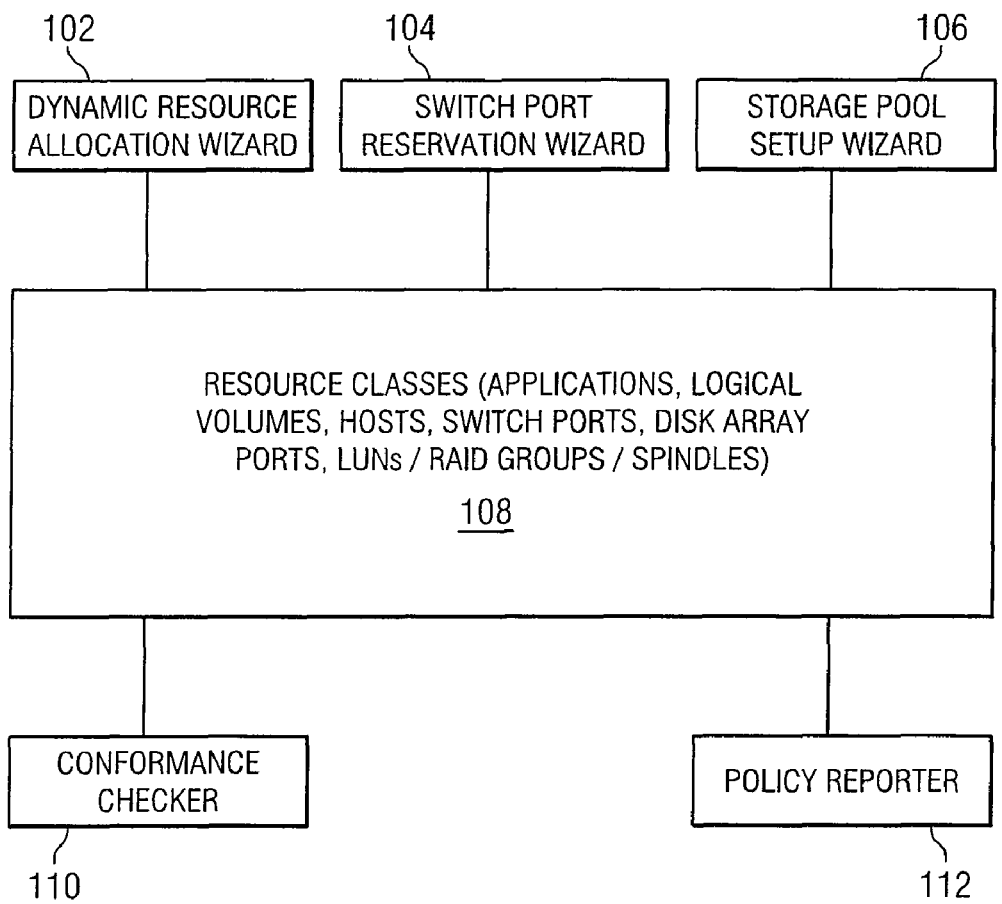
FIG. 1 is an architectural diagram illustrating the components of the system of the present disclosure in one embodiment.

FIG. 1 is an architectural diagram illustrating the components of the system of the present disclosure in one embodiment. One or more policy wizards 102, 104, 106 guide the user through the various reservation methods. Policy wizards are java based in one embodiment, and may be made available through a commercially available SAN Explorer and SAN Manager products, for instance, as a separate global policy with tabs for every resource class from an available SAN Manager product start menu. The policy wizards may also be available through the SAN Manager products' portal. as well.

An example of a policy resource wizard is a dynamic resource allocation wizard 102, which specifies the type of volume an application should be automatically assigned when provisioning new disk space. Examples of resource classes utilized by the dynamic resource allocation wizard may include application, logical volume, and host 108. Another example of a policy resource wizard is a switch port reservation wizard 104, which specifies what a port should be connected to in the future. An example of a resource class utilized by the switch port reservation wizard is a switch port 108. Yet another example of a policy resource wizard is a storage pool setup wizard 106, which allows a user to reserve unused storage according to capacity planning rules. For example a list of spindles could be reserved for a list of hosts. In the event that the spindles are used, policy conformance is checked to assure that the disk space is assigned properly, for example, by a conformance checker 110. This wizard, for example, has three resource levels: Spindles (raw disks), RAIDgroups, and LUNs 108.

In one embodiment, resource allocation policies are resource class dependent. For example, the following resource classes have policies defined: Applications, Logical Volumes, Hosts, Switch Ports, Disk array ports, LUNs/RAIDgroups/Spindles 108.

Different types of policies may exist depending on the resource type. Self-healing/resource planning policies type has enforcement rules defined, and addresses resources such as Switch Ports, Disk array ports, LUNs/RAIDgroups/Spindles. Zoning policies type also has enforcement rules defined, and addresses resources such as Switch Ports, RAID ports, Logical/Physical Volumes.

Resource planning/self-healing policies have enforcement actions that can be invoked when policy violations occur. In one embodiment, a disabling method is available that prevents an erroneous resource allocation. An example of a preventive action for resources such as the switch port may be an action that disables the ports. An example of a preventive action for resources such as the Disk Array ports may be an action that zones out port and/or disables the connected switch port. An example of a preventive action for resources such as the LUNs/RAIDgroups/Spindles may be an action that masks out the LUN.

Additional enforcement rules are available for all of these objects, for instance, in case the administrator only wishes to be notified of policy violations or would like to switch a particular policy off for testing, etc. These additional enforcement rules may include: Do nothing; Send warning message.

Other enforcement actions may also send warning messages as well. The default enforcement action may be set to "Send warning message" for all self-healing policies. These messages can be used to institute user customized actions to react to policy violations through an available event management system. For example, an administrator may send an e-mail or a wireless message, for instance, coupled to the SAN manager, to a system's event management system, which would initiate its own actions based on the message (event) received.

In one embodiment, the policy rules and enforcement actions are stored within the Common Services Worldview Repository (CORE) as properties to their corresponding resource classes.

In one embodiment, a policy conformance checker 110 checks for proper conformance. For instance, for resource capacity planning, self-healing policies there is a conformance check by resource class. For each class a conformance check method is made available through a runtime dll. The following conformance checks are defined: Check switch port for reservation conformance; Check RAID port for reservation conformance; Check LUN for reservation conformance; Check RAIDgroup for reservation conformance; Check Spindle for reservation conformance.

For zoning policies, the conformance check is checked whenever a zone change occurs. The hierarchy for zoning policies is not within the protected resources but in the hierarchy of objects on which level zoning can be defined, for example, fabric, switch, switch port level. Examples of checks in these policies are: Check zone for fabric zoning policy (no zoning, hard, soft zones, zone by node, zone by fcid); Check zone for switch zoning policy (no zoning, hard, soft zones, zone by node, zone by fcid); Check zone for port zoning policy (no zoning, hard, soft zones, zone by node, zone by fcid).

In one embodiment, the system and method of the present disclosure also may include policy reports, for example, generated by a policy reporter 112. Policy reports about future allocation keep the user informed about pending policies. In one embodiment, an overall status report provides details about existing policies as well as possible conflicts. Capacity/utilization reports may be updated to include reserved capacity/utilization. A report of all past policy violations may also be available.

The policy conformance checker 110 can be implemented as a runtime library, and integrated into active SAN discovery, zone manager, and storage manager components. These components are responsible for generating intelligent configuration change events. Whenever anything in the SAN changes, for example a new device is added, or the active zone set of a fabric changes, a new LUN is created and made available, the conformance checks are launched.

Figure 6:
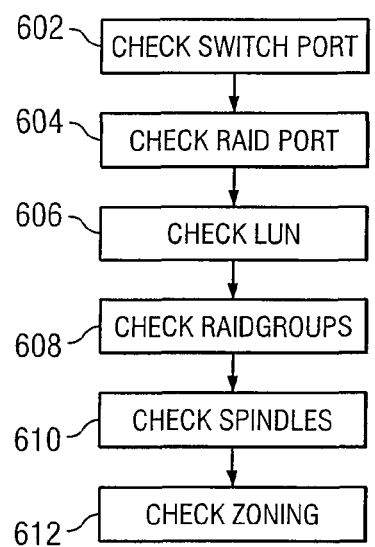
FIG. 6 illustrates a flow diagram for the policy conformance checker in one embodiment.

FIG. 6 illustrates a flow diagram for the policy conformance checker in one embodiment. At 602, switch port for reservation conformance is checked, for example, when a configuration change event is detected in one or more switch ports. At 604, RAID port for reservation conformance is checked, for example, when a configuration change event is detected in one or more RAID ports. At 606, LUN for reservation conformance is checked, for example, when a configuration change event is detected in one or more LUNs. At 608, RAIDgroup for reservation conformance is checked, for example, when a configuration change event is detected in one or more RAIDgroups. At 610, Spindle for reservation conformance is checked, for example, when a configuration change event is detected in one or more Spindles. At 612, further zoning conformance check may be performed, for example, when a zone change occurs. Example of zone checking include fabric zoning policy check, switch zoning policy check, and port zoning policy check.

The system and method of the present disclosure accommodates the policies on different platforms, for instance, since how the policies are implemented may depend on different default device behavior. For example on some director type switches the default behavior for zoning disabled is that no device can see the other. On others, if no zones are enabled all the devices have access to each other.

For disk arrays there are a couple of different behaviors in creating, masking, and exporting LUNs. On some arrays for example LUNs will be mapped to all ports when exported. On some disk array the LUN number is global, on some it is not. For example, on high end disk arrays LUN 0 on port 1 is not the same as LUN 0 on port 2. These disk arrays usually have an LDEV (logical device) concept. Usually, an LDEV is mapped 1:1 to a RAID group. An LDEV can be mapped to several ports (1:n relationship).

On low end disk arrays the LUN is usually mapped to the RAID group directly. To check the access rights to RAID groups and spindles, the conformance checker adjusts to these different layouts. Thus, the access check functions have device properties defined and use them accommodate these differences.

Some examples of access check properties are:

| Switches: | NoZoningByDefaultVisible | Boolean |
|---|---|---|
| | FibreTrunkingSupported | Boolean |
| Disk Arrays: | LUNsMaskedByDefault | Boolean |
| | LUNsMappedToAllPortsByDefault | Boolean |
| | LDEVSupported | Boolean |

In one embodiment, these properties are made available as properties to the corresponding resource classes such as switches, storage subsystems, in the CORE (Worldview repository) as well. In one embodiment, these properties are read-only.

FIG. 2 illustrates an example listing of resource classes, their supported policies and their hierarchies, that is, a list of policy types and enforcement actions for a plurality of resources. In one embodiment, reservations are saved through properties in the matching resource WV classes. Examples of the identifiers of the various reservation methods are range of hosts, host that may include IP (Internet Protocol) address (WV address property), WV name property, UUID of object in WV; Cluster, which may include IP address (WV address property), WV name property, UUID of object in WV; WorldWideName, which may induce portWWN (WV property of all fibre channel port types), nodeWWN (WV property of StorageSubsystems, HBAs, TapeSubsystems), UUID of port; Operating System, which may include class name of WV host (e.g. Windows2000Server); Logical Volume and/or Physical Volume, which may include Name of WV object, UUID of WV object.

Figure 3:
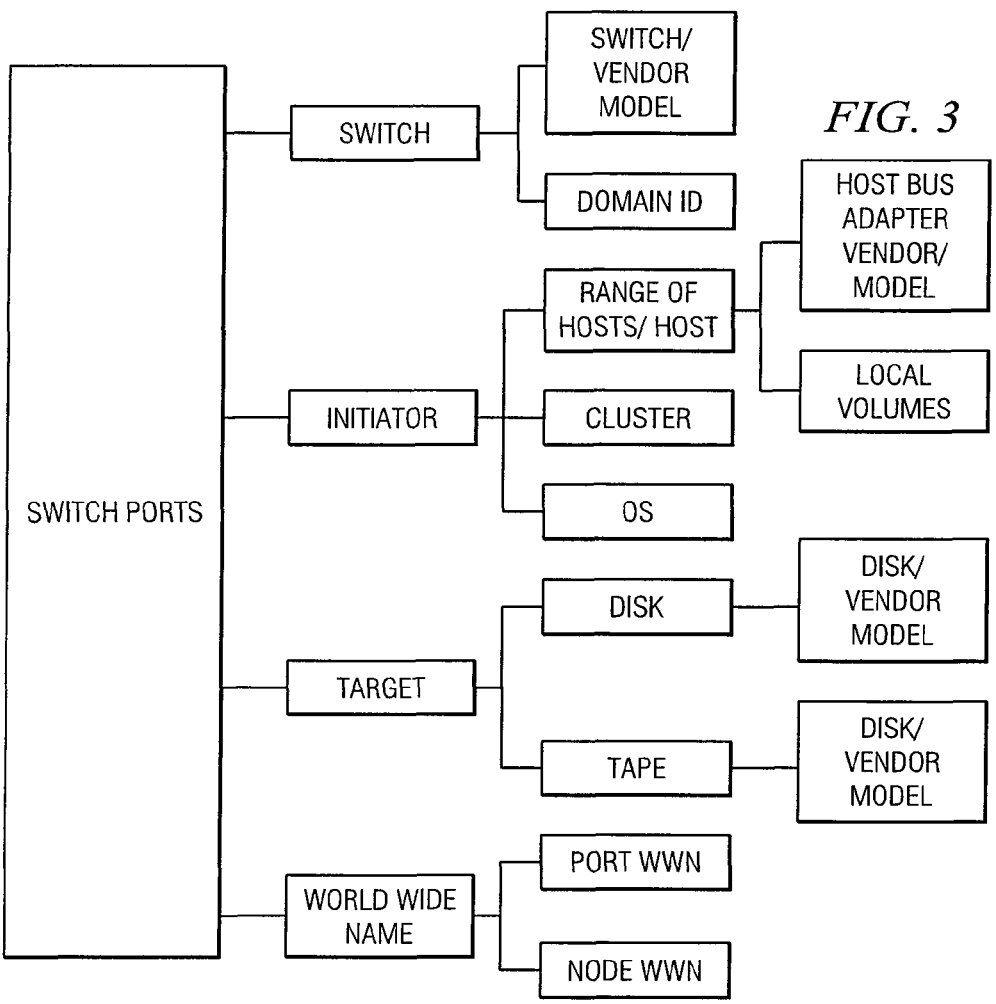
FIG. 3, FIG. 4, and FIG. 5 illustrate resource class hierarchy diagram for switch ports, disk array ports, and LUN/RAID group/Spindle resources respectively.
Figure 4:
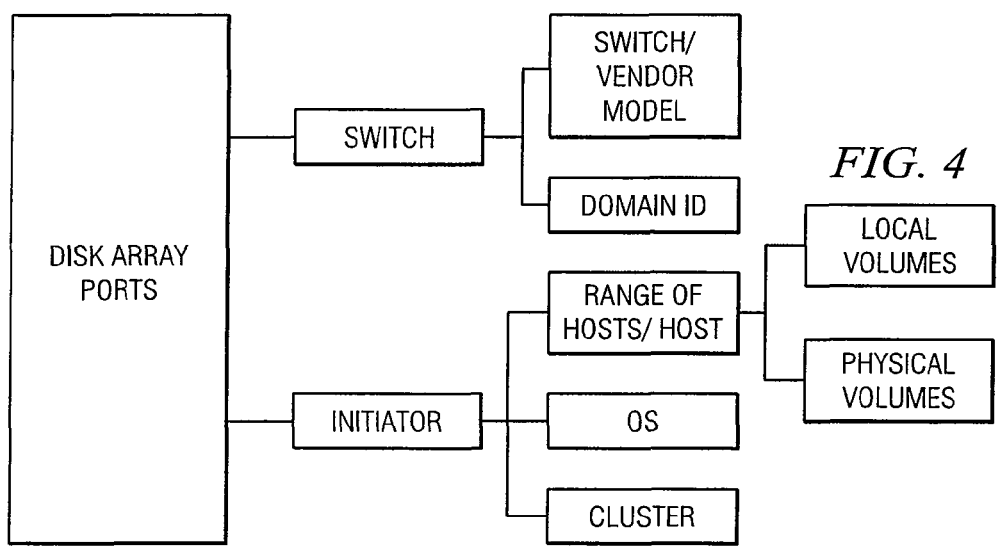
Figure 5:
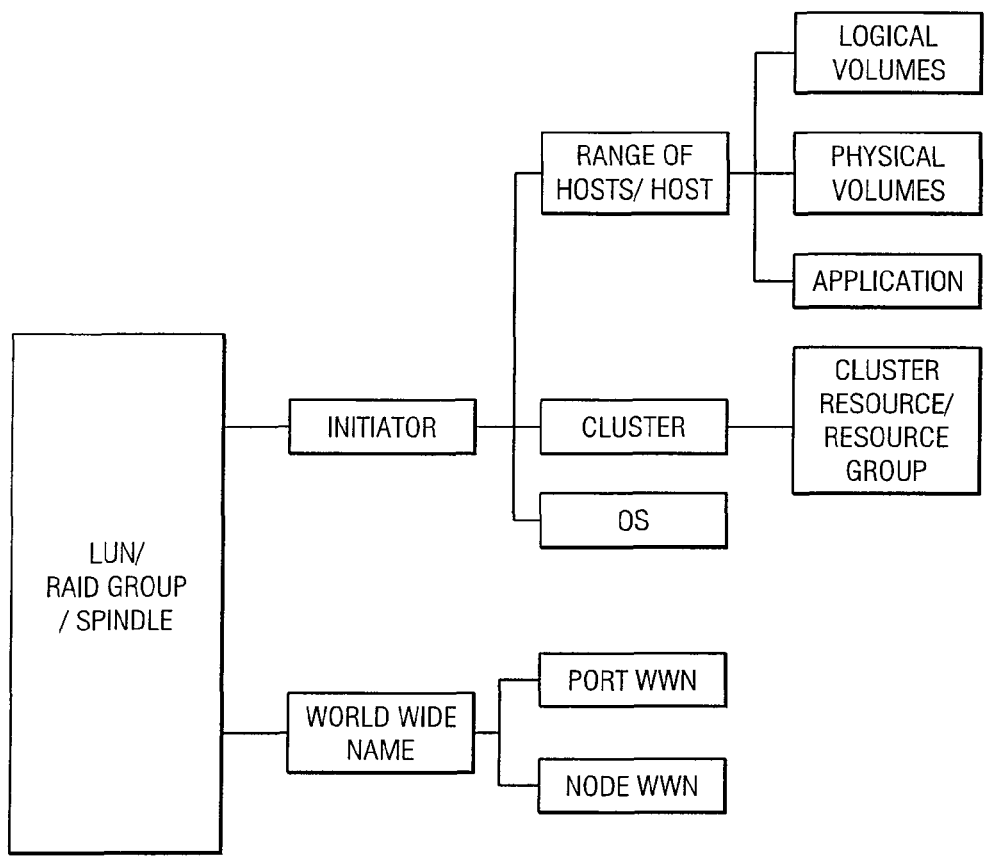

FIG. 3, FIG. 4, and FIG. 5 illustrate resource class hierarchy diagram for switch ports, disk array ports, and LUN/RAID group/Spindle resources respectively. All classes in Worldview which are corresponding to the resource classes may be updated by the following properties:

| | |
|---|---|
| PolicyReservationHierarchy: | String |
| PolicyEnforcementAction: | String |

The policy wizards, in one embodiment, may gather the resource allocation of the user through selection screens. Reservation hierarchy string is then created, the resource is mapped to the corresponding Worldview class, and the reservation properties are filled. The policy wizards may fill in the reservation hierarchy property by, for example, using a grammar to express the tree branch that has been traversed to reserve a resource. For example, to reserve a RAID group for a Logical Volume on a Windows host the PolicyReservationHierarchy property may look like this:

Initiator:RangeOfHosts{xxx.xxx.xxx.xxx}:LogicalVolume: C; or

Initiator:Cluster:{xxx.xxx.xxx.xxx}

To reserve a switch port for a disk array the property may look like this:

Target: Disk

Thus, the reservation hierarchy grammar, in one embodiment, may have the following rules: tree nodes are separated by ":"; if a tree node has an identifier assigned then the identifying property is listed with "{" and "}" and is separated by ",";

The reservation hierarchy can be cut off at any level in the tree. In one embodiment, only one tree branch is used to reserve a resource.

In one embodiment, the system and method of the present disclosure enables administrators to automatically import SAN policies designed through SAN designer technology. For instance, SAN Manager can tie into the original design intends of the user. Users can design their SAN in Visio through SAN Designer. An import tool from SAN Designer may allow SAN Manager to capture the intent of the storage administrator. The import utility sets up the reservation policies according to the SAN Designer layout. For example, if a specific disk array is connected to one switch port, SAN Manager reserves this switch port for storage and the vendor/model that was specified. At the same time SAN Manager checks, if the already connected ports match the SAN design. A report may be launched that warns the user of all inconsistencies. In the case where a port is not connected and reserved for future usage, SAN Manager waits until a port comes online and then run the policy checks accordingly. If enforcement actions were set SAN Manager could disable the port from being put online whenever there are policy violations.

In another embodiment, the system and method of the present disclosure utilized configuration events that SAN Manager is able to capture. These events are user to detect policy violations when a user changes a storage configuration. It is assumed that the user can choose any tool to make these configuration changes. The system and method of the present disclosure detects a configuration change event even if the change was made through another tool but their own. For example, a user could use an element manager of a switch or disk array to activate a new zone set or create a new LUN. The SAN Manager of the present disclosure, in one embodiment, supplies the event and is able to counteract its negative effects even though the change was not made through its own tools.

The self-healing and capacity planning policies of the present disclosure in one embodiment allows the user to reserve all SAN resources such as switch port, disk array port, LUNs, RAID groups, or spindles before actual provisioning action is performed. Human error is still one of the highest risk when managing a SAN. The potential to destroy valuable data is great. A very common error is to give read/write access to hosts of different operating systems to the same volume. If one of the operating systems were to not recognize the disk as valid, the operating system would format the disk, treating it as a raw volume. The result is loss of data. The system and method of the present disclosure, via the policies, reserves unassigned disk space for specific applications, hosts, or operating systems and trigger preventive actions if mistakes are made such as masking a LUN or disabling a port. This in one aspect, provides full change control, in that the storage is laid out exactly the way it was planned.

In addition, the events monitored by a SAN manager, for example, all zone configuration and connectivity changes, all LUN configuration changes, all the events necessary to trigger policy checks and enforcement actions are detected and acted upon according to the policy provisioning of the present disclosure. Thus, even if the user is making changes through another tool such as a switch element manager, policies are enforced.

The system and method of the present disclosure may be implemented and run on a general-purpose computer. The embodiments described above are illustrative examples and it should not be construed that the present invention is limited to these particular embodiments. Thus, various changes and modifications may be effected by one skilled in the art without departing from the spirit or scope of the invention as defined in the appended claims.

I claim:

1. A storage self-healing and capacity planning system, comprising:
   a computer comprising:
      one or more policy wizard modules which when run on the computer:
         setup a plurality of policies associated with a plurality of computer storage device resources, the plurality of policies comprising a pre-allocation of storage space associated with the plurality of computer storage device resources by an administrator, the pre-allocation of storage space set up before a provisioning of the plurality of computer storage device resources is performed;
         map each of the plurality of computer storage device resources to one of a plurality of computer resource classes, such that the pre-allocation of storage space is resource class dependent; and
         for each computer resource class, identify a list of a plurality of hosts to which computer storage device resources within a particular computer resource class are pre-allocated; and
      a conformance policy checker which when run on the computer:
         receives a request from a selected one of the plurality of hosts, the request comprising a configuration change event requesting allocation of a portion of storage space;
         maps the portion of storage space identified in the request to a corresponding computer resource class;
         determines if the specific one of the plurality of hosts is on the list of the plurality of hosts identified for the resource class associated with the portion of storage space;
         invokes one or more enforcement rules associated with the policy to prevent any erroneous allocation of the portion of the storage space to the specific one of the plurality of hosts; and
         in response to the configuration change event, performs change monitoring to check all allocations of the selected computer resource class to determine whether all allocations of the selected computer resource class match the plurality of policies.

2. The system of claim 1, further including a policy reporter generates one or more reports about the policy.

3. The system of claim 1, wherein the one or more computer storage device resources include an application, a logical volume, a host, a switch port, a disk array port, a logical unit number, a RAID group, or a spindle, or combinations thereof.

4. The system of claim 1, wherein the plurality of policies are saved as one or more properties associated with the plurality of resource classes.

5. The system of claim 1, wherein the one or more enforcement rules include one or more warning messages.

6. The system of claim 1, wherein the one or more enforcement rules include disabling the one or more computer storage device resources prior to any allocation of the one or more computer storage device resources to prevent any erroneous allocation of the computer storage device resources.

7. The system of claim 1, wherein the plurality of policies are setup based on user input.

8. A storage self-healing and capacity planning method, comprising:
   allowing a plurality of policies to be reserved for a plurality of computer storage device resources, the plurality of policies comprising a pre-allocation of storage space associated with the plurality of computer storage device resources by an administrator, the pre-allocation of storage space set up before a provisioning of the plurality of computer storage device resources is performed;
   mapping each of the plurality of computer storage device resources to one of a plurality of computer resource classes such that the pre-allocation of storage space is resource class dependent;

for each computer resource class, identifying a list of a plurality of hosts to which computer storage device resources within a particular computer resource class are pre-allocated;

receiving a request from a selected one of a plurality of hosts, the request comprising a configuration change event requesting allocation of a portion of storage space;

mapping the portion of storage space identified in the request to a corresponding computer resource class;

determining if the specific one of the plurality of hosts is on the list of the plurality of hosts identified for the resource class associated with the portion of storage space;

invoking an enforcement rule associated with the policy to prevent any erroneous allocation of the portion of the storage space to the specific one of the plurality of hosts; and in response to the configuration change event, performing change monitoring to check all allocations of the selected computer resource class to determine whether all allocations of the selected computer resource class match the plurality of policies.

9. The method of claim 8, wherein the invoking an enforcement rule includes disabling the computer storage device resource prior to any allocation of the computer storage device resource to prevent any erroneous allocation of the computer storage device resource.

10. The method of claim 8, wherein the invoking an enforcement rule includes sending a warning message.

11. The method of claim 8, further including: generating a report about the policy.

12. The method of claim 8, further including:
assigning each of the plurality of policies as one or more properties of the plurality of resource classes.

13. The method of claim 8, wherein the portion of the storage space comprises new disk space, and wherein the allowing one or more policies to be reserved includes:
allowing the new disk space associated with one or more new disk volumes to be reserved for an application on the specific one of the plurality of hosts before the new disk space is requested.

14. The method of claim 8, wherein the portion of the storage space comprises one or more switch ports, and wherein the allowing the policy to be reserved includes:
allowing one or more switch ports to be reserved for connection to an application on the specific one of the plurality of hosts in the future.

15. The method of claim 8, wherein the allowing the policy to be reserved includes:
allowing unused storage to be reserved to one or more of spindles, RAID groups, and LUNs.

\* \* \* \* \*